(12) United States Patent
Taniguchi et al.

(10) Patent No.: US 8,603,670 B2
(45) Date of Patent: *Dec. 10, 2013

(54) SECONDARY BATTERY

(75) Inventors: Yasutomo Taniguchi, Minamiawaji (JP); Yusuke Itoh, Itano-gun (JP); Takumi Mishiro, Kasai (JP); Yasuhiro Yamauchi, Sumoto (JP); Toshiyuki Nohma, Kobe (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/543,147

(22) Filed: Jul. 6, 2012

(65) Prior Publication Data

US 2012/0270085 A1    Oct. 25, 2012

Related U.S. Application Data

(63) Continuation of application No. 12/878,638, filed on Sep. 9, 2010, now Pat. No. 8,241,786.

(30) Foreign Application Priority Data

Sep. 30, 2009    (JP) .................................. 2009-227254

(51) Int. Cl.
*H01M 2/08* (2006.01)
*H01M 2/02* (2006.01)

(52) U.S. Cl.
USPC ............................ 429/185; 429/181; 429/178

(58) Field of Classification Search
USPC .......................................... 429/185, 181, 178
See application file for complete search history.

(56) References Cited

U.S. PATENT DOCUMENTS

| | | | |
|---|---|---|---|
| 2005/0095502 A1 | 5/2005 | Sugimune et al. | |
| 2006/0063068 A1* | 3/2006 | Cheon et al. | 429/161 |
| 2009/0087737 A1 | 4/2009 | Yamauchi et al. | |

FOREIGN PATENT DOCUMENTS

| | | |
|---|---|---|
| JP | 2004-014173 A | 1/2004 |
| JP | 2008-251411 A | 10/2008 |
| JP | 2009-087693 A | 4/2009 |
| JP | 2009-87736 A | 4/2009 |

* cited by examiner

*Primary Examiner* — Helen O Conley
(74) *Attorney, Agent, or Firm* — Westerman, Hattori, Daniels & Adrian, LLP (57) ABSTRACT

By combining crimping fixing and laser welding, a collector attached to a substrate of an electrode assembly is fixed to a terminal. A negative electrode terminal 19A has a terminal portion formed on one side of a flange portion, and a cylindrical crimping member 19*b* on the other side. The cylindrical crimping member 19*b* is inserted through openings formed in a first insulating member, a sealing plate, a second insulating member, and a negative electrode collector 18*a*. The cylindrical crimping member 19*b* is crimped in a diameter-increasing direction, and is mechanically fixed in a countersunk hole 18*c* of the negative electrode collector 18*a*. A peripheral portion of a thin-walled portion 19*d* having a thickness smaller than those of other portions formed at the tip end portion of the cylindrical crimping member 19*b* is thoroughly adhered and welded by a high energy beam to the edge of the countersunk hole 18*c*.

19 Claims, 8 Drawing Sheets

SECONDARY BATTERY

CROSS-REFERENCE TO RELATED APPLICATIONS

This application is a Continuation of U.S. patent application Ser. No. 12/878,638 filed on Sep. 9, 2010, which is based upon and claims the benefit of priority from the prior Japanese Patent Application No. 2009-227254, filed on Sep. 30, 2009, the entire contents of which are incorporated herein by reference.

TECHNICAL FIELD

The present invention relates to a secondary battery, and more particularly, to a secondary battery having a structure in which a collector attached to a substrate of an electrode assembly and a terminal are firmly welded in a short period of time without an increased output of a high energy beam such as a laser beam or an electron beam.

BACKGROUND ART

With the rise of the environmental protection movement in recent years, emission regulations for carbon dioxide and similar gases causing global warming have been made more stringent and the automobile industry is vigorously developing electric vehicles (EVs) and hybrid electric vehicles (HEVs), in addition to automobiles using fossil fuels such as gasoline, diesel oil, and natural gas. Nickel hydrogen secondary batteries or lithium ion secondary batteries have been used as the batteries for these EVs and HEVs. In recent years, nonaqueous electrolyte secondary batteries such as lithium ion secondary batteries, which are lightweight and have high capacity, have come into common use.

Batteries for EVs and HEVs are also required to achieve, in addition to environmental responsiveness, a highly developed traveling capacity in a basic performance of automobiles, such as an acceleration performance or a hill climbing performance. In order to achieve these requirements, it is not only necessary to increase battery capacity, but also increase the battery output power. Generally, prismatic sealed batteries having a structure in which electric power generating elements are accommodated in a prismatic outer can made of an aluminum-based metal are used as nonaqueous electrolyte secondary batteries for EVs and HEVs. When a battery is discharged at high power, a high current is applied to the battery. Therefore, the battery needs to have low resistivity and the internal resistance needs to be reduced as much as possible. Also, various improvements have been made to achieve low resistivity in terminal portions.

Figure 6A:
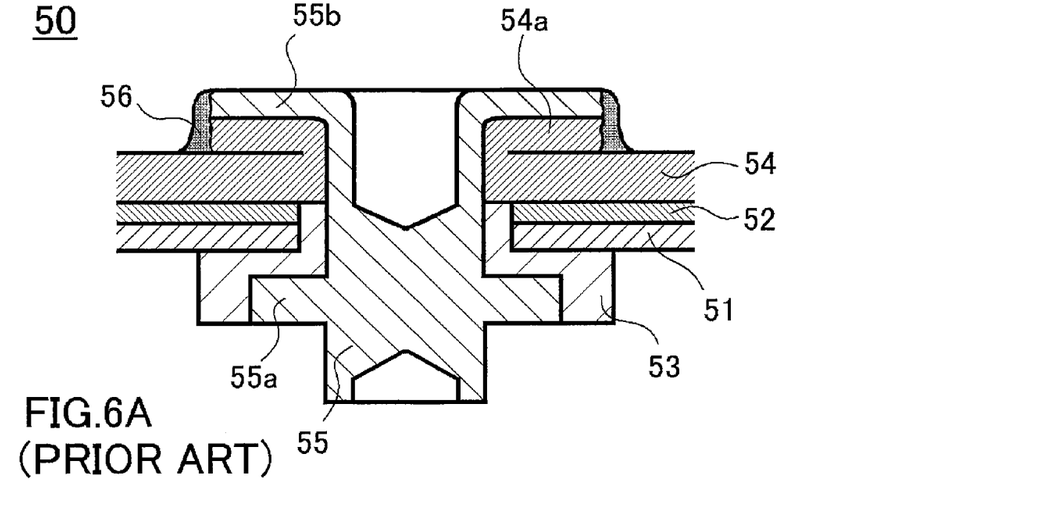
FIG. 6A is a sectional view of a joint section of a collector and a terminal portion according a related-art example shown in an upside down manner.

A mechanical crimping method has been used most commonly as a method for realizing low resistivity in terminal portions of these batteries. However, performing only mechanical crimping will cause chronological change in electrical resistivity under conditions in which vibration is frequently applied such as in EVs and HEVs, thus the mechanical crimping method is used in combination with a laser welding method. An example of electrically joining a collector and a terminal by combining the mechanical crimping method and the laser welding method disclosed in JP-A-2004-14173 will be explained with reference to FIGS. 6A and 6B. FIG. 6A is a sectional view showing, in an upside down manner, a joint section of a collector and a terminal portion disclosed in JP-A-2004-14173, and FIG. 6B is a sectional view of the joint section of the collector and the terminal of FIG. 6A before laser welding.

A joint section 50 of the collector and the terminal disclosed in JP-A-2004-14173 includes, a cover plate 51 fixed to a battery outer body (not shown), an internal insulating sealing member 52 and an outer insulating sealing member 53, a collector 54 coupled to electric power generating elements, and a rivet terminal 55, as shown in FIG. 6A. The internal insulating sealing member 52 and the outer insulating sealing member 53 include through holes and are arranged at the edges of both inner and outer circumferences of an opening formed in the cover plate 51. The collector 54 includes a terminal hole and a projecting body 54a hanging down along the terminal hole, and is arranged over the internal insulating sealing member 52. The rivet terminal 55 includes a rivet portion 55b projected from and connected to a jaw portion 55a.

The joint section 50 is assembled as follows. The rivet portion 55b of the rivet terminal 55 is inserted through, from the outer circumference side of the cover plate 51, the through holes of the internal insulating sealing member 52 and the outer insulating sealing member 53, the opening of the cover plate 51, and a rivet terminal hole of the collector 54. Next, the rivet portion 55b of the rivet terminal 55 is crimped so as to press the projecting body 54a of the collector 54, and thereafter, a welded portion 56 is form by laser welding the rivet portion 55b and the collector 54.

Figure 6B:
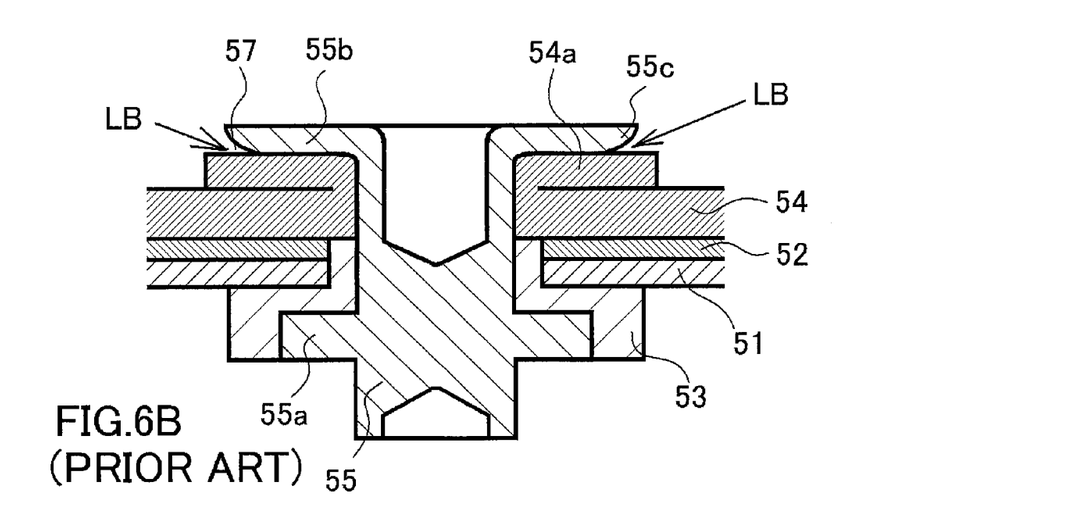
FIG. 6B is a sectional view of the joint section of the collector and the terminal of FIG. 6A before laser welding.

By the crimping method of the related-art example shown in FIG. 6A, as shown in FIG. 6B, a tip end 55c of the crimping member after crimping the rivet portion 55b of the rivet terminal 55 is thinner towards the tip because the rivet portion 55b is thinned and extended towards the tip. Thus, a gap 57 is formed between the projecting body 54a of the collector 54 and the tip end 55c of the crimping member. Therefore, welding of the projecting body 54a of the collector 54 and the tip end 55c of the crimping member is performed by obliquely irradiating the gap with a laser beam at about 45 degrees. The laser beam is multiply reflected within the gap so as to fuse and join the tip end 55c of the crimping member and the projecting body 54a of the collector 54. Thus, the welded portion 56 as shown in FIG. 6A is obtained.

Assist gas is used for such a laser welding. Since the assist gas does not thoroughly enter the periphery of the welding portion 56 within the gap, metal fine powder sputtered during laser irradiation is oxidized, whereby soot-like metal oxidized fine particles are adhered on the welding member. In addition, when industrially manufacturing the batteries, laser welding of the terminal portions is performed in the assembly line, and therefore, deviation of laser irradiation position with respect to the welding portion 56 of the batteries may occur. When the laser beam irradiation position deviates to the projecting body 54a side of the collector 54, the amount of laser beam to be irradiated on the tip end 55c side of the crimping member of the rivet terminal 55 decreases, and therefore, the welding becomes insufficient. On the other hand, when the laser beam irradiation position deviates to the tip end 55c side of the crimping member of the rivet terminal 55, the surface on the tip end 55c side of the crimping member 55b is sputtered, and therefore, normal laser welding cannot be performed. In addition, in the above related-art example, since the laser is irradiated from an oblique direction with respect to the welding member, the welding member needs to be rotated in order to irradiate multiple portions symmetrically. Therefore, the manufacturing device becomes complicated.

Figure 7A:
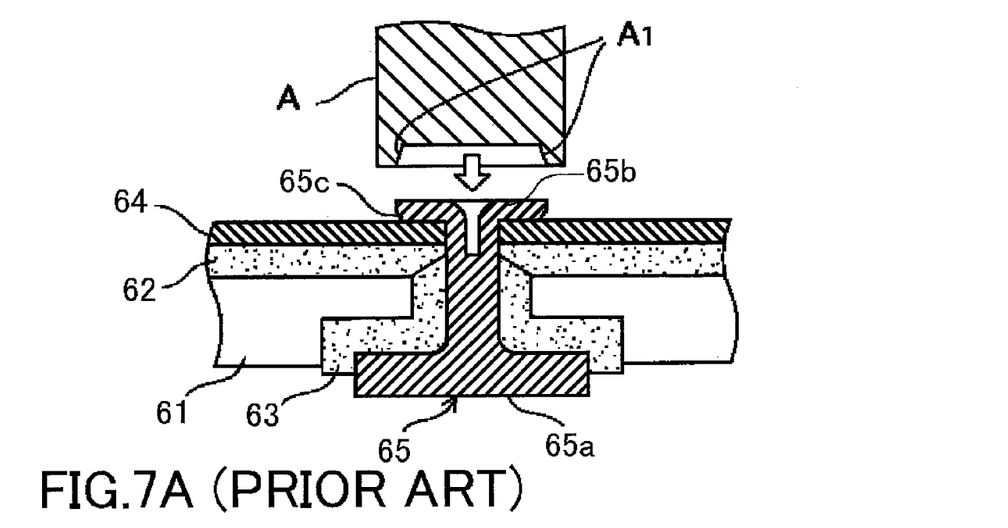
FIG. 7A is a sectional view showing a processing step of a tip end of a crimping portion of a terminal according to another related-art example.
Figure 7B:
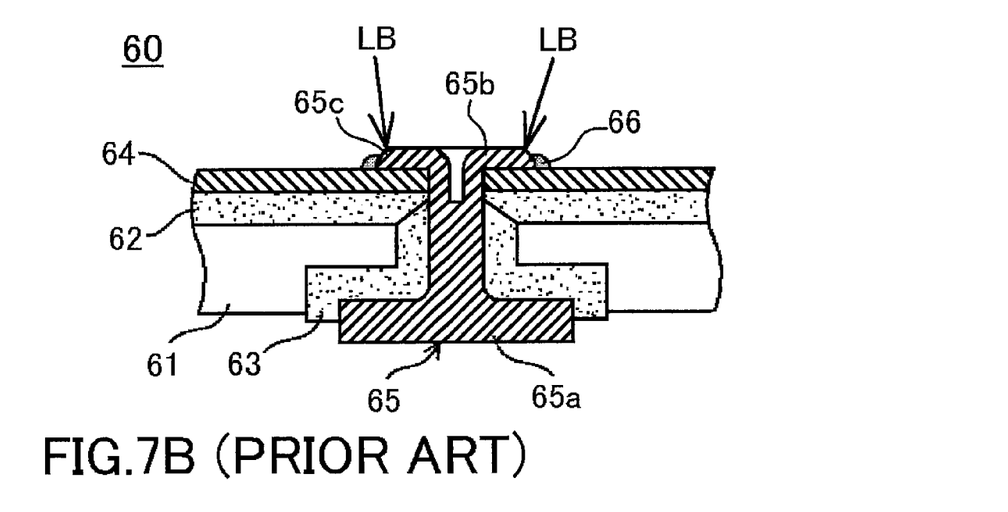
FIG. 7B is a diagram showing a step of laser welding after the step in FIG. 7A.

In order to solve the issues of the above related-art example, JP-A-2008-251411 discloses the following example. A processing punch having a specific shape is used to form the tip end side of a crimping portion of a terminal so as no gaps are formed between a collector and the tip end of the crimping portion. A laser beam is irradiated with respect to the tip end of the crimping portion, and the terminal and collector are laser welded. The laser welding method of the collector and crimping portion disclosed in JP-A-2008-251411 will be explained with reference to FIGS. 7A and 7B. FIG. 7A is a sectional view showing a processing step of the tip end of the crimping portion of the terminal disclosed in JP-A-2008-251411, and FIG. 7B is a diagram showing a step of laser welding after the step of FIG. 7A.

A joint section 60 of the collector and the terminal disclosed in JP-A-2008-251411 includes a cover plate 61 fixed to a battery outer body (not shown), an internal insulating sealing member 62 and an outer insulating sealing member 63, a collector 64 coupled to electric power generating elements, and a rivet terminal 65. The internal insulating sealing member 62 and the outer insulating sealing member 63 include through holes and are arranged at the edges of both inner and outer circumferences of an opening formed in the cover plate 61. The collector 64 is arranged over the internal insulating sealing member 62. The rivet terminal 65 includes a crimping portion 65b projected from and coupled to and a jaw portion 65a.

The joint section 60 is assembled as follows. The crimping portion 65b of the rivet terminal 65 is inserted through, from the outer circumference side of the cover plate 61, the outer insulating sealing member 63, the opening of the cover plate 61, the internal insulating sealing member 62, and a rivet terminal hole of the collector 64, and are integrated by crimping the crimping portion 65b of the rivet terminal 65 by pressing the collector 64. Steps up to here are substantially the same as those disclosed in JP-A-2004-14173 as shown in FIGS. 6A and 6B. A processing punch A, which includes a recessed portion complementary to the crimping portion 65b of the rivet terminal 65, and also includes an inclined portion A1 having a predetermined angle with respect to the peripheral edge of the recessed portion, is prepared. The processing punch A is pressed in so as the inclined portion A1 abuts the tip end 65a of the crimping portion 65b. The tip end 65c of the crimping portion 65b is partially deformed, and the tip end 65c of the crimping portion 65b is formed into a circular truncated cone portion, as shown in FIG. 7B. Thus, the shape of the tip end 65c of the crimping portion 65b is adjusted to have a blunt angle.

Next, the laser welding is performed by irradiating the top surface of the circular truncated cone portion of the tip end 65c of the crimping portion 65b with the laser beam LB in the perpendicular direction or in the direction close to the perpendicular direction. At this time, the irradiation range of the laser beam LB is the area including at least the collector 64 and the circular truncated cone portion of the tip end 65c of the crimping portion 65b. With this laser welding, energy of the laser irradiated to both of the collector 64 and the circular truncated cone portion of the tip end 65c of the crimping portion 65b is transferred without being distortion, whereby a favorable welding spot (nugget) 66 is formed in the welding portion.

Figure 8A:
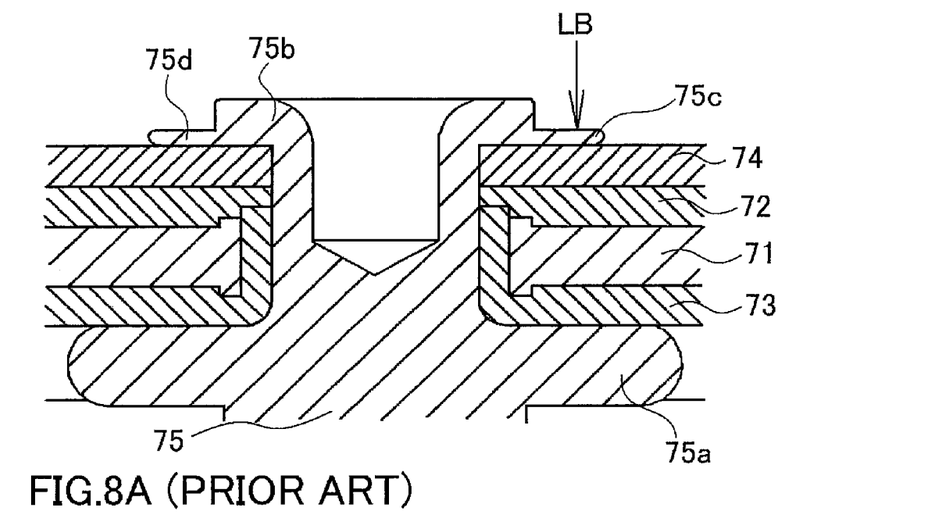
FIG. 8A is a sectional view of a state after a crimping step of a rivet terminal according to still another related-art example.
Figure 8B:
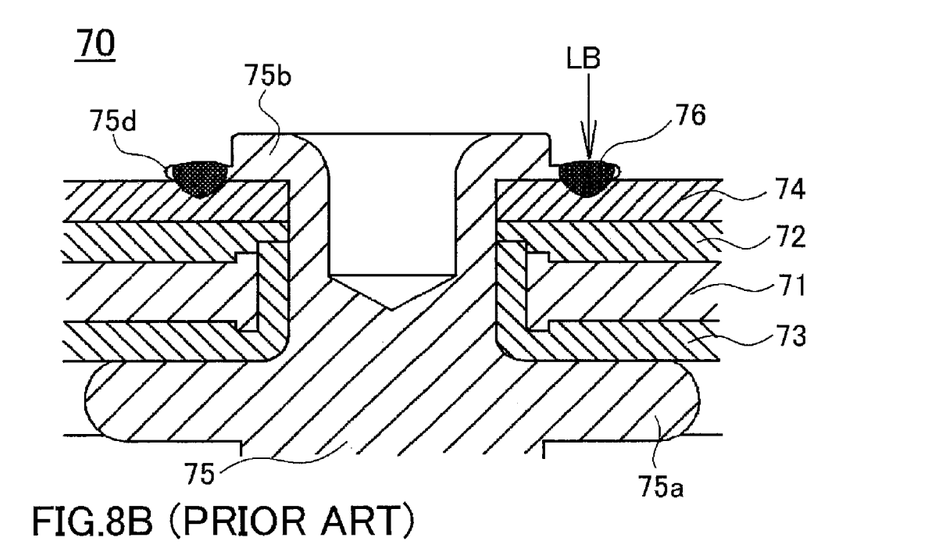
FIG. 8B is a diagram showing a step of laser welding after the step in FIG. 8A.

Furthermore, in order to solve the problems of the above related-art techniques, JP-A-2009-087693 discloses an example of laser welding a terminal and collector by forming a tip end side of a crimping portion of a rivet terminal into a thin-walled portion by using a processing punch having a specific shape, by leaving no gaps between the collector and the tip end of the crimping portion, and by irradiating a laser beam with respect to the thin-walled portion of the crimping portion. The laser welding method of the collector and crimping portion disclosed in JP-A-2009-087693 will be explained with reference to FIGS. 8A and 8B. FIG. 8A is a sectional view showing the state after the crimping step of the rivet terminal disclosed in JP-A-2009-087693, and FIG. 8B is a diagram showing the step of laser welding after the step in FIG. 8A.

A joint section 70 of a collector and a terminal disclosed in JP-A-2009-087693 also includes a cover plate 71 fixed to a battery outer can (not shown), an internal insulating sealing member 72 and an outer insulating sealing member 73, a collector 74 coupled to electric power generating elements, and a rivet terminal 75. The internal insulating sealing member 72 and the outer insulating sealing member 73 include through holes, and are arranged at the edges of both inner and outer circumferences of an opening formed in the cover plate 71. The collector 74 is arranged over the internal insulating sealing member 72. The rivet terminal 75 includes a crimping member 75b projected from and connected to a jaw portion 75a.

The joint section 70 is assembled as follows. The crimping portion 75b of the rivet terminal 75 is inserted through, from the outer circumference side of the cover plate 71, the through hole of the outer insulating sealing member 73, the opening of the cover plate 71, the internal insulating sealing member 72, and a rivet terminal hole of the collector 74. Next, the crimping portion 75b of the rivet terminal 75 is integrated by crimping by pressing the collector 74. At this time, the crimping portion 75b of the rivet terminal 75 is formed with a thin-walled portion 75d having a small thickness annularly by using a punch having its peripheral portion annularly projected as a crimping jig. The thin-walled portion 75d of the crimping portion 75b of the rivet terminal 75 thoroughly adheres the collector 74, and also a portion with a flat surface is formed annularly.

Next, the thin-walled portion 75d of the crimping portion 75b is laser welded by irradiating the laser beam LB in the perpendicular direction or in a nearly perpendicular direction. At this time, the irradiation range of the laser beam LB may be anywhere within the thin-walled portion 75d of the crimping portion 75b of the rivet terminal 75. With this laser welding, the laser is surely irradiated to the surface of the thin-walled portion 75d of the crimping portion 75b even if the laser beam irradiation position deviates, whereby a favorable nugget 76 is formed in the welding portion.

The structure of the joint section 60 disclosed in JP-A-2008-251411 has an advantage that the welding portion does not have to be rotated even when symmetrically laser welding multiple portions since the laser beam can be irradiated from above the welding portion. However, this structure also presents an issue. While the area including the collector 64 and the circular truncated cone portion of the tip end 65c of the crimping portion 65b is being welded, preferable welding cannot be performed if the laser irradiation position deviates to the crimping portion side due to the large thickness of the crimping portion 65b. In addition, if the laser irradiation position deviates to the collector 64 side, the welding portion becomes small, and the strength of the welding portion becomes weak.

The structure of the joint section 70 disclosed in JP-A-2009-087693 has the same advantage as those of the joint section 60 disclosed in JP-A-2008-251411, and also has an advantage that the terminal portion and the collector can be favorably laser welded even if the laser irradiation position deviates due to the small thickness of the crimping portion 75b. However, the joint section 70 disclosed in JP-A-2009-087693 has the collector 74 melted after the melt portion of the crimping portion 75b penetrates the crimping portion 75b by the laser beam irradiation, and therefore, there is a problem that the laser beam output has to be large, and also the laser beam irradiation time has to be extended in order to increase the welding strength.

SUMMARY

An advantage of some aspects of the invention is to provide a secondary battery having a joint section that, when welding the terminal and the collector with a high energy beam such as a laser beam or an electron beam, is capable of performing secure welding in a short period of time without increasing the output of the high energy beam, and also capable of performing high strength welding even if the high energy beam irradiation position is slightly deviated.

According to a first aspect of the invention, a secondary battery has a sealing plate fitted with a terminal, an electrode assembly, and an outer can housing the electrode assembly and having a mouth portion to which the sealing plate is hermetically fitted, the terminal and a collector of the electrode assembly being electrically coupled with each other. The terminal has a terminal portion formed on one side of a flange portion, and a cylindrical crimping member formed on the other side of the flange portion. The cylindrical crimping member is inserted through openings formed in a first insulating member, the sealing plate, a second insulating member, and the collector. A tip end side of the cylindrical crimping member is crimped in a diameter-increasing direction in a countersunk hole formed in the collector. A thin-walled portion having a thickness smaller than those of other portions formed at an end portion of the crimping member is fitted in the countersunk hole of the collector. The flange portion of the terminal, the first insulating member, the sealing plate, the second insulating member, and the collector are mechanically fixed to each other. Furthermore, a joint section of the thin-walled portion of the crimping member and the countersunk hole of the collector is laser welded with a high-energy beam.

In the secondary battery of the aspect of the invention, the tip end side of the circular crimping member of the terminal is crimped in a diameter-increasing direction in the countersunk hole formed in the collector. The thin-walled portion having a thickness smaller than those of other portions formed on the end portion of the crimping member is fitted in the countersunk hole of the collector. The flange portion of the terminal, the first insulating member, the sealing plate, the second insulating member, and the collector are mechanically fixed to each other. Therefore, since the terminal and the collector are mechanically and firmly fixed to each other, electric resistance between the terminal and the collector is reduced. Also, in the secondary battery of the aspect of the invention, since the thin-walled portion of the end portion of the crimping member is fitted into the countersunk hole of the collector, the terminal and the collector hardly moves even if vibration is applied thereto, and therefore, variation of electric resistance between the terminal and the collector is reduced.

In addition, in the secondary battery of the aspect of the invention, the joint section of the thin-walled portion of the end portion of the crimping member and the countersunk hole of the collector is welded by a high-energy beam such as a laser beam or an electron beam. The welding strength of the welding portion becomes large even when the melting depth is small, since the welding of the welded portion by the high-energy beam is performed by directly melting the surface of the thin-walled portion of the end portion of the crimping member and the surface of the collector. Therefore, the high-energy beam output can be made small compared to that of the related-art example, and also manufacturing can be performed in an energy saving manner since the irradiation time of the high-energy beam can be shortened. In addition, in the secondary battery of the aspect of the invention, welding can be performed by irradiating from above the joint section of the thin-walled portion of the end portion of the crimping member and the countersunk hole of the collector by the high-energy beam. Therefore, manufacturing efficiency increases since welding can be performed merely by moving the irradiation head for irradiating the high-energy beam even when symmetrically welding using a high-energy beam.

Moreover, the secondary battery of the aspect of the invention may be applied to both a nonaqueous electrolyte secondary battery such as a lithium ion battery and an aqueous electrolyte secondary battery such as a nickel hydrogen secondary battery.

In the secondary battery of the aspect of the invention, the thin-walled portion having a thickness smaller than those of other portions formed on the end portion of the crimping member is preferably formed partially around the crimping member.

In order to form the thin-walled portion of the end portion of the crimping member over the entire circumference of the peripheral edge, the punching pressure for thinning the end portion of the crimping member needs to be made large. Increasing of the punching pressure shortens the life of the punch and also increases stress on the crimping member. In the secondary battery of the aspect of the invention, the thin-walled portion of the end portion of the crimping member is formed partially around the crimping member. Therefore, the end portion of the crimping member can be preferably thinned even with low punching pressure. Also, the resistance value between the terminal and the collector becomes saturated even without welding the entire circumference of the joint section of the thin-walled portion of the end portion of the crimping member and the countersunk hole of the collector with a high energy beam. Therefore, manufacturing efficiency increases in accordance with the decrease of the number of portions welded by the high-energy beam while preferably achieving the above advantages. Moreover, the thin-walled portion having a thickness smaller than those of other portions formed on the end portion of the crimping member is preferably ½ with respect to the entire circumference.

In the secondary battery of the aspect of the invention, the shape of the countersunk hole in a plan view is preferably circular or elliptical, and the shape of a stepped portion in a plan view of the thin-walled portion having a thickness smaller than those of other portions formed on the end portion of the crimping member with respect to the other portions of the terminal on the center side is preferably a circular arch which is curved in the same direction as the edge of the countersunk hole.

If the shape of the countersunk hole in a plan view is circular or elliptical, in the case of forming the thin-walled portion of the end portion of the crimping member only at a part of the crimping member, the gap between the edge of the countersunk hole and the outermost circumference side of the portion thinned becomes unstable when the thinning is performed by a punch so as to make the center side of the terminal straight. At both end portions of the outermost circumference side of the portion thinned, the width of the gap between the edge of the countersunk hole and the terminal portion of the crimping portion thinned becomes large, and the area that can be welded by the high-energy beam becomes small. In the secondary battery of the aspect of the invention, the shape of the stepped portion in a plan view of the thin-walled portion having a thickness smaller than those of other portions formed on the end portion of the crimping member with respect to the other portions of the terminal on the center side is a circular arch which is curved in the same direction as the edge of the countersunk hole. Thus, the shape in plan view of the thin-walled portion having a thickness smaller than those of other portions formed on the end portion of the crimping member becomes circular plane. With the secondary battery of the aspect of the invention, the outermost circumference side of the crimping member thinned can be formed substantially along the edge of the countersunk hole, and therefore, the welding area can be increased.

In the secondary battery of the aspect of the invention, the following relationship is preferably satisfied over the entire thin-walled portion partially formed:

$$0.5 \le L1/L2 < 1.0$$

where, when a straight line is drawn from the center of the terminal towards the thin-walled portion, L1 denotes the distance from the center of the terminal to the intersection point of the straight line and the stepped portion on the center side of the terminal of the thin-walled portion, and L2 denotes the distance from the center of the terminal to the intersection point of the straight line and the edge of the countersunk hole.

If the following relationship is satisfied over the entire thin-walled portion partially formed:

$$0.5 \le L1/L2 < 1.0$$

when a straight line is drawn from the center of the terminal towards the thin-walled portion having a thickness smaller than those of other portions, the thin-walled portion having a thickness smaller than those of other portions formed on the end portion of the crimping member can be formed substantially along the edge of the countersunk hole. Also, the area to be laser welded can be increased, and therefore, preferable welding can be performed with the high-energy beam. Moreover, if L1/L2 is less than 0.5, this will reduce the effect that is obtained by making the shape of the stepped portion in plan view of the thin-walled portion being thinned on the end portion of the crimping member with respect to the other portions of the terminal on the center side into a circular arch. The more preferable numerical range of L1/L2 is 0.9 or more and less than 1.0. When $0.9 \le L1/L2 < 1.0$ is satisfied over the entire thin-walled portion formed partially, the welding can be further preferably performed by the high energy beam because no substantial gaps are generated between the thin-walled portion partially formed and the edge of the countersunk hole.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. However, the following embodiments only show examples of a prismatic nonaqueous electrolyte secondary battery in which a terminal and collector are welded by using a laser beam as a high-energy beam as a secondary battery for embodying the technical concept of the invention, and it is not intended to limit the invention to these prismatic nonaqueous electrolyte secondary batteries. Therefore, the invention can also be applied equally to other embodiments within the scope of the appended claims.

A prismatic nonaqueous electrolyte secondary battery as a secondary battery common to all embodiments of the invention will be explained first with reference to FIGS. 1 to 4. In the invention, a high-energy beam used for welding includes a laser beam and an electron beam. Hereinafter, the laser beam will be described and the electron beam will be omitted.

Figure 1:
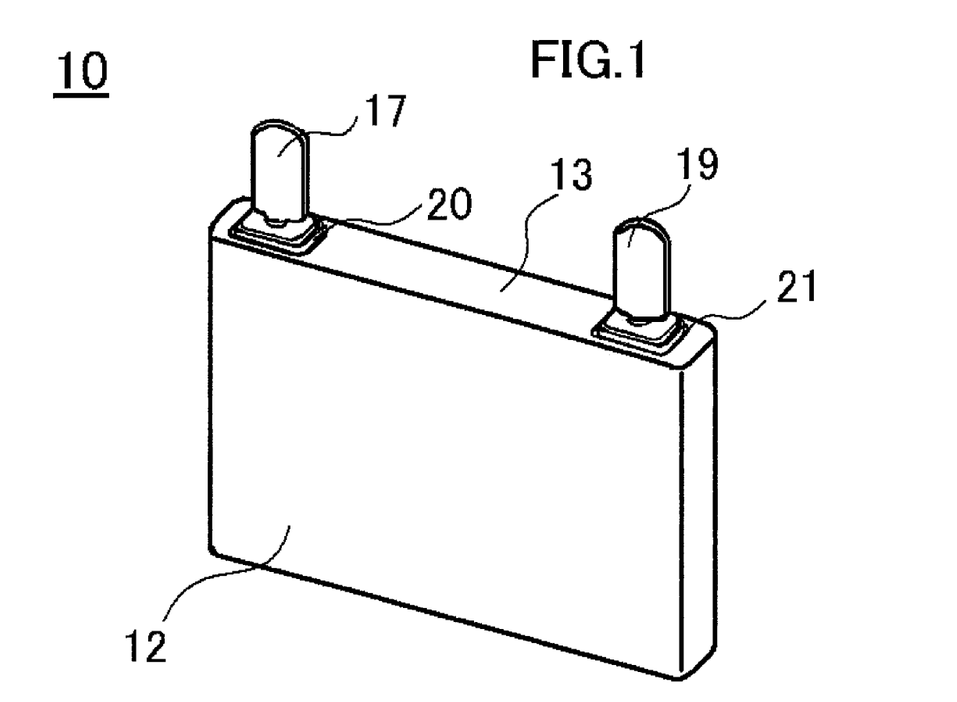
FIG. 1 is a perspective view of a secondary battery common to all embodiments.
Figure 2A:
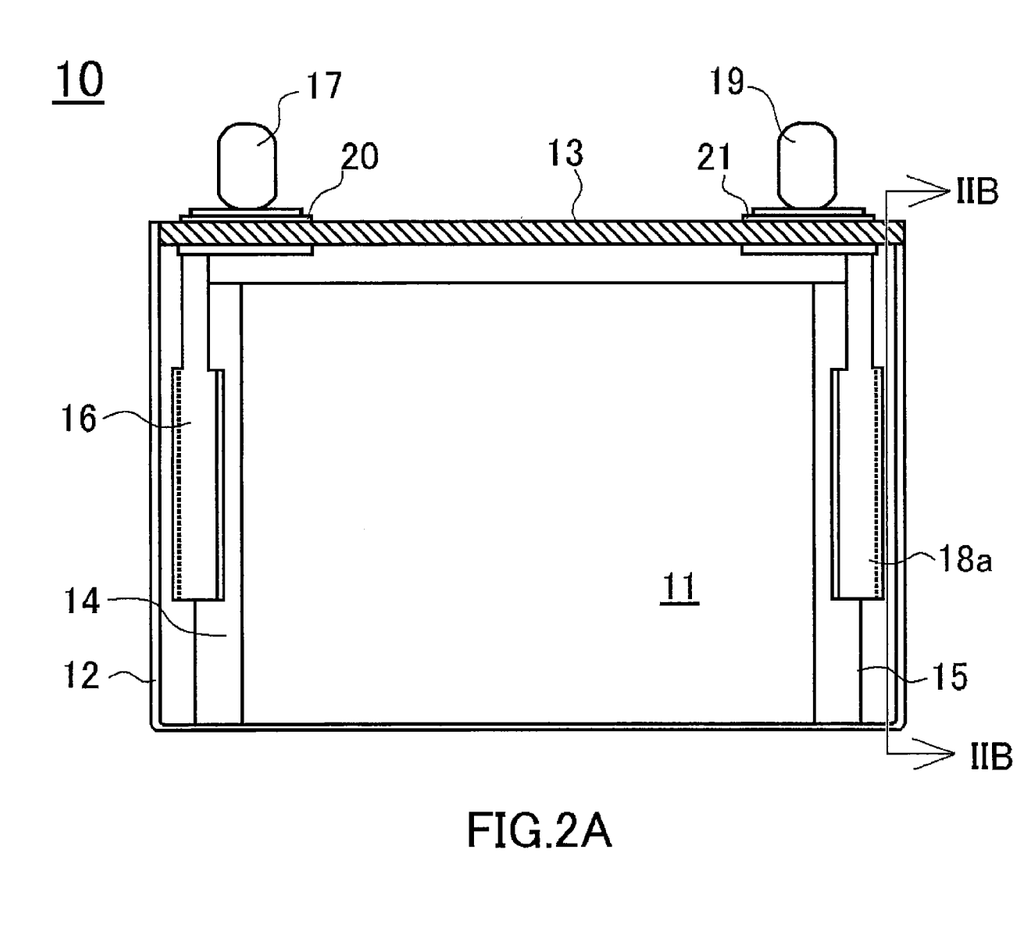
FIG. 2A is a front view of an internal structure of the secondary battery of FIG. 1.
Figure 2B:
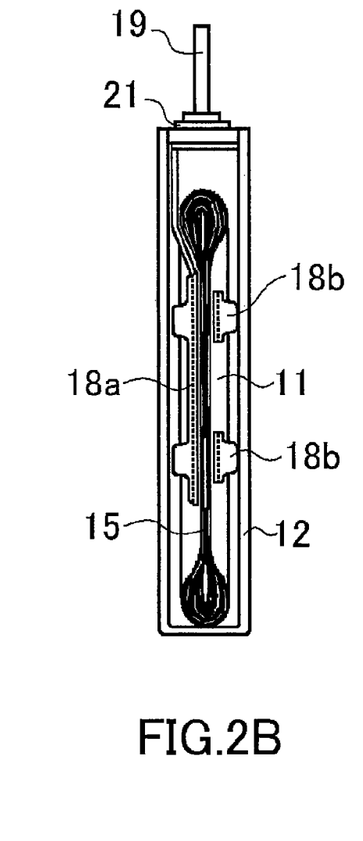
FIG. 2B is a sectional view taken along the line IIB-IIB of FIG. 2A.

This nonaqueous electrolyte secondary battery 10 has a structure in which a flat rolled electrode assembly 11 formed by rolling a positive electrode plate and a negative electrode plate with a separator interposed therebetween (not shown completely) is accommodated in a prismatic battery outer can 12 which is sealed by a sealing plate 13.

The positive electrode plate is produced as follows. A positive electrode active material mixture is applied on both surfaces of a positive electrode substrate made of aluminum foil, and is dried, and thereafter, the substrate with the positive electrode active material is rolled so that a positive electrode substrate exposed portion 14 where strip-shaped aluminum foil is exposed is formed. The negative electrode plate is produced as follows. A negative electrode active material mixture is applied on both surfaces of a negative electrode substrate made of copper foil, and is dried, and thereafter, the substrate with the negative electrode active material is rolled so that a negative electrode substrate exposed portion 15 where strip-shaped copper foil is exposed is formed. The flat rolled electrode assembly 11 is formed as follows. The positive electrode plate and the negative electrode plate are rolled into a flat shape with a porous polyethylene separator (not shown) interposed therebetween so that the positive electrode substrate exposed portion 14 and the negative electrode substrate exposed portion 15 are positioned at both ends in the rolling axis direction.

The positive electrode substrate exposed portion 14 is coupled with a positive electrode terminal 17 via a positive electrode collector 16. The negative electrode substrate exposed portion 15 is coupled with a negative electrode terminal 19 via the negative electrode collector 18a. The positive terminal 17 and the negative terminal 19 are fixed to the sealing plate 13 via insulating members 20 and 21, respectively. This nonaqueous electrolyte secondary battery 10 is manufactured as follows. The flat rolled electrode assembly 11 is inserted in the prismatic battery outer can 12, and then the sealing plate 13 is laser welded to a mouth portion of the battery outer can 12. Thereafter, a nonaqueous electrolyte is poured from an electrolyte pour hole (not shown), and then the electrolyte pour hole is sealed up.

Specific structures of the positive electrode terminal 17 and the negative electrode terminal 19 will be explained. Normally, the difference between these two is that the positive electrode collector 16 is made of aluminum metal, and the negative electrode collector 18a is made of copper metal. Other structures are substantially the same, and therefore, the negative electrode terminal 19 will be explained, and the positive electrode terminal 17 will be omitted.

Figure 3:
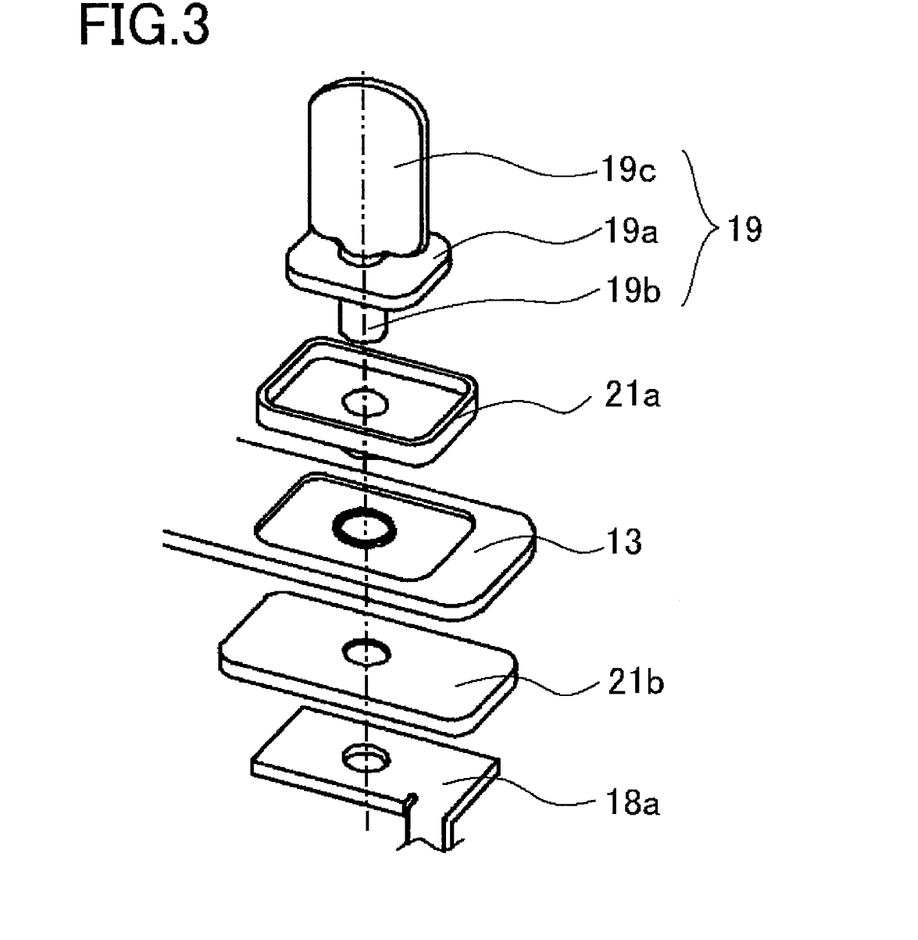
FIG. 3 is a perspective view of a terminal common to all embodiments before assembling.
Figure 4:
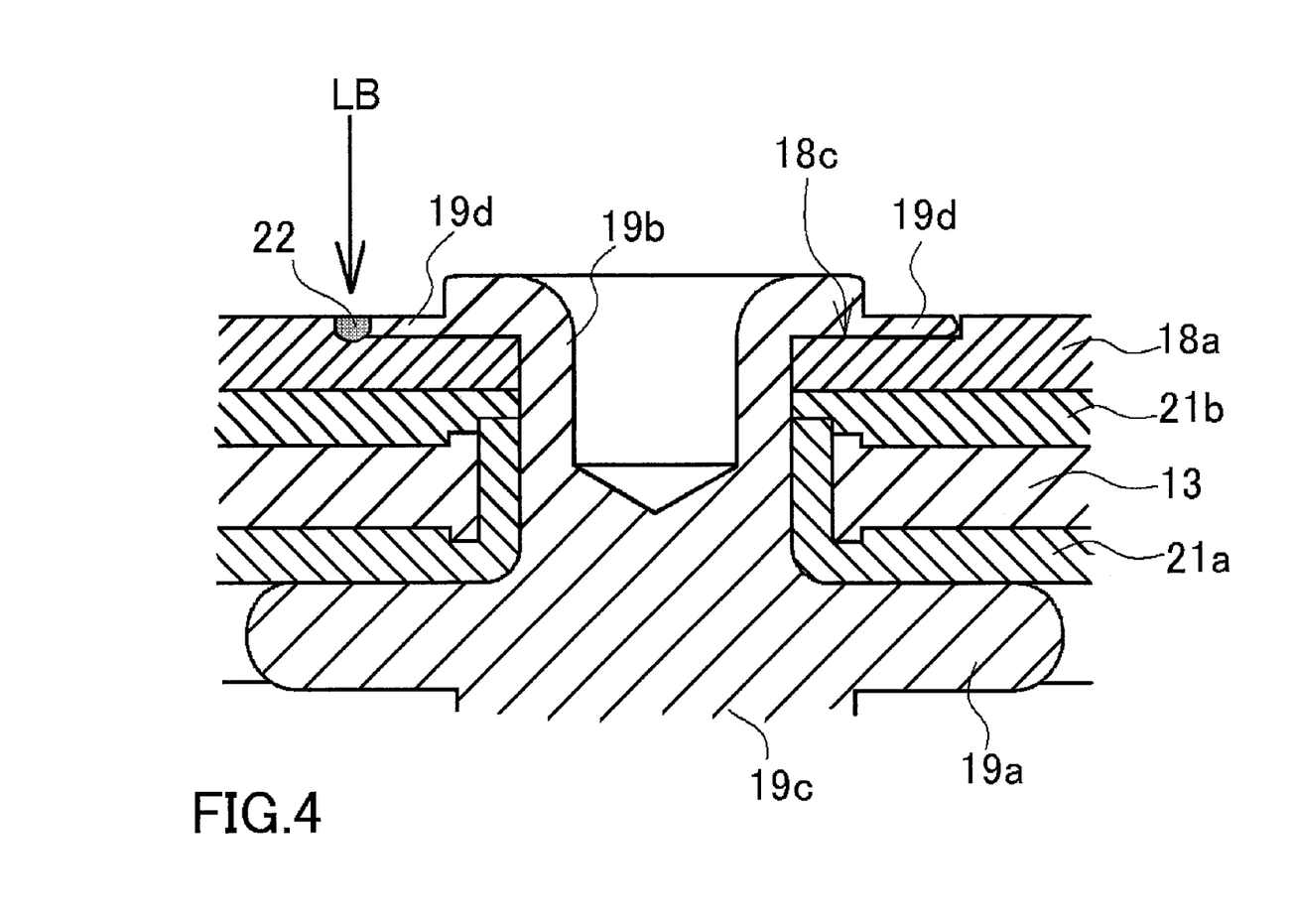
FIG. 4A is a partial sectional view of the terminal common to all embodiments after assembling and laser welding.

As shown in FIG. 3, the negative electrode terminal 19 includes a cylindrical crimping member 19b formed on one side of a flange portion 19a, and a terminal portion 19c formed on the other end of the flange portion 19a. This cylindrical crimping member 19b is assembled by being inserted through openings formed in a gasket 21a as a first insulator, the sealing plate 13, an insulating member 21b as a second insulator, and the negative electrode collector 18a. For the negative electrode collector 18a, a collector having a countersunk hole 18c formed in the periphery of the opening through which the crimping member 19b of the negative electrode terminal 19 is inserted, as shown in FIG. 4, is used.

The negative electrode terminal 19 is placed on a jig (not shown) in the assembled state so that the terminal portion 19c faces downward, and is crimped so that the diameter of the crimping member 19b increases equally in all directions from the tip end side of the crimping member 19b. Also, a thin-walled portion 19d having a thickness smaller than those of other portions of the crimping member 19b is partially formed at the tip end side of the crimping member 19b. Thus, the thin-walled portion 19d at an end portion of the crimping member 19b is thoroughly adhered to the negative electrode collector 18a, and the surface thereof is made flat, as shown in FIG. 4. Also, the thin-walled portion 19d of the end portion of the crimping member 19b is fit in the countersunk hole 18c of the negative electrode collector 18a. In this state, a laser beam LB is irradiated on a joint section of the thin-walled portion 19d of the end portion of the crimping member 19b and the countersunk hole 18c of the negative electrode collector 18a. The surface of the thin-walled portion 19d of the end portion of the crimping member 19b and the surface of the negative electrode collector 18a are directly melted and laser welded, whereby the negative electrode terminal 19 common to all embodiments is obtained. The reference numeral 22 denotes a nugget formed by laser welding.

The negative electrode terminal 19 common to all embodiments has the following structure. The tip end side of the cylindrical crimping member 19b of the negative electrode terminal 19 is crimped in a diameter-increasing-direction in the countersunk hole 18c formed in the negative electrode collector 18a. Also, the thin-walled portion 19d having a thickness smaller than those of other portions is formed. This thin-walled portion 19d is fitted into the countersunk hole 18c of the negative electrode collector 18a. In addition, the flange portion 19a of the negative electrode terminal 19, the gasket 21a, the sealing plate 13, the insulating member 21b, and the negative electrode collector 18a are mechanically fixed to each other. Thus, the negative electrode terminal 19 and the negative electrode collector 18a are mechanically and firmly fixed to each other. Furthermore, the negative electrode terminal 19 and the negative electrode collector 18a hardly moves even if vibration is applied since the thin-walled portion 19d of the end portion of the crimping member 19b is fitted into the countersunk hole 18c of the negative electrode collector 18a.

Also, in this negative electrode terminal 19, the joint section of the thin-walled portion 19d of the end portion of the crimping member 19b and the countersunk hole 18c of the negative electrode collector 18a is laser welded so that the surface of the thin-walled portion 19d of the end portion of the crimping member 19b and the surface of the negative electrode collector 18a are directly melted. Thus, the welding strength of the welding portion becomes strong even if the melting depth is small, and therefore, favorable laser welding can be performed even with lower output of a laser beam compared to that of the related-art example. Also, manufacturing can be performed in an energy saving manner since the laser beam irradiation time can be shortened. Furthermore, since the welding can be performed by irradiating the laser beam from above the joint section of the thin-walled portion 19d of the end portion of the crimping member 19b and the countersunk hole 18c of the negative electrode collector 18a, the welding can be performed just by moving a laser head for irradiating the laser beam even in the case where the laser welding needs to be performed symmetrically.

The thin-walled portion 19d of the end portion of the crimping member 19b is formed only at a portion where the laser welding is performed, and therefore it is not necessary to be formed over the entire circumference of the crimping member 19b. In order to form the thin-walled portion 19d of the end portion of the crimping member 19b over the entire circumference of the end portion of the crimping member 19b, punching pressure applied to a forming punch needs to be made large. However, increasing the punching pressure shortens the life of the punch and also increases stress on the crimping member 19b. On the other hand, in a case of forming the thin-walled portion 19d of the end portion of the crimping member 19b partially around of the crimping member 19b, the thin-walled portion 19d can be favorably formed even with small punching pressure applied to the forming punch.

First Embodiment

Figure 5A:
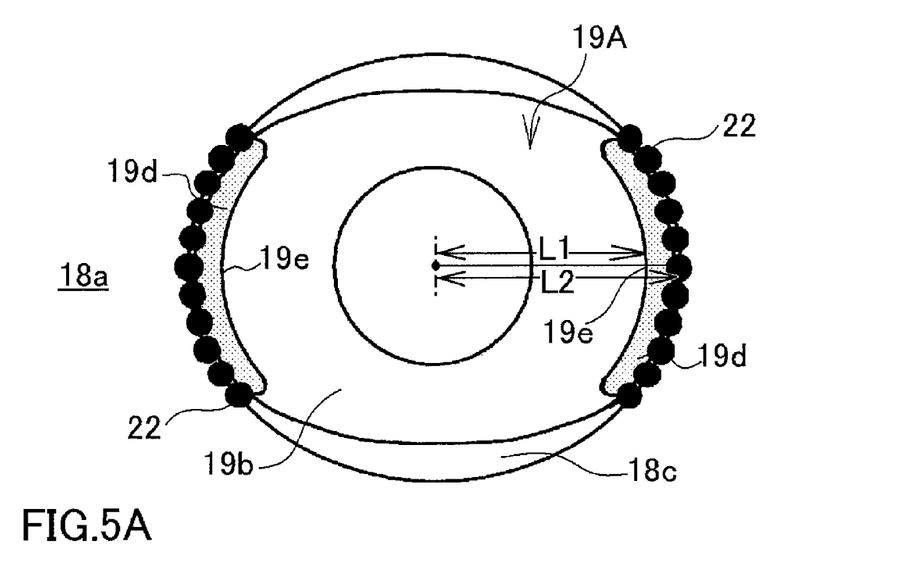
FIG. 5A is a plan view of a terminal after welding according to a first embodiment of the invention.

The structure of a negative electrode terminal 19A of a first embodiment of the invention will be explained with reference to FIG. 5A. Regarding the negative electrode terminal 19A of the first embodiment, a forming punch partially formed with an annular projection is used when partially forming the thin-walled portion 19d having a thickness smaller than those of other portions of the crimping member 19b at the tip end side of the crimping member 19b. The countersunk hole 18c formed in the negative electrode collector 18a has a circular or elliptical shape in plan view. In the negative electrode terminal 19A of the first embodiment, the countersunk hole 18c having an elliptical shape in a plan view is used, as shown in FIG. 5A. By using the forming punch partially formed with an annular projection, when a straight line is drawn from the center of the negative electrode terminal 19A towards the thin-walled portion 19d, the distance from the center of the negative electrode terminal 19A to the intersection point of the straight line and a stepped portion 19e on the center side of the negative electrode terminal 19A of the thin-walled portion 19d is L1, and the distance from the center of the negative electrode terminal 19A to the intersection point of the straight line and the edge of the countersunk hole 18c is L2. In such a case, $0.5 \leq L1/L2 < 1.0$ is satisfied over the entire thin-walled portion 19d partially formed.

In such a structure, the end portion of the thin-walled portion 19d of the crimping member 19b can be formed substantially along the edge of the countersunk hole 18c, and therefore, the length of the laser welding area can be increased. As a result of experiments, by making the numerical range of L1/L2 to be 0.9 or more and less than 1.0, the end portion of the crimping member was thinned to provide substantially no gap with respect to the edge of the countersunk hole. Therefore, further favorable laser welding can be performed. The shape of the edge of the countersunk hole 18c and the shape of the stepped portion 19e on the center side of the negative electrode terminal 19A of the thin-walled portion 19d preferably have the same curvature.

Second Embodiment

Figure 5B:
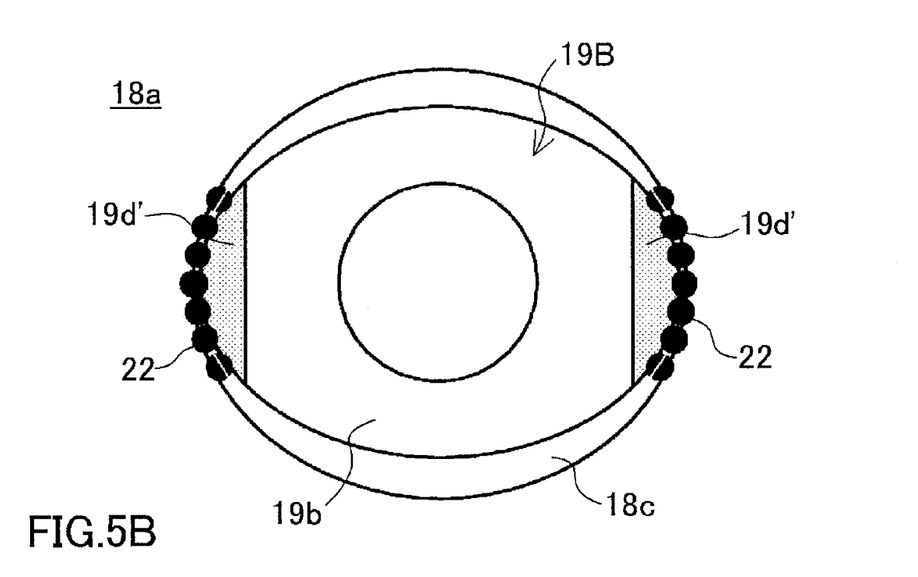
FIG. 5B is a plan view of a terminal after welding according to a second embodiment of the invention.

The structure of a negative electrode terminal 19B of a second embodiment of the invention will be explained with reference to FIG. 5B. Regarding the negative electrode terminal 19B of the second embodiment, a forming punch circularly shaped partially on the outer circumference side and linearly shaped on the center side of the negative electrode terminal 19B (not shown) is used when partially forming the thin-walled portion 19d having a thickness smaller than those of other portions of the crimping member 19b at the tip end side of the crimping member 19b. Even by using the punch of such a structure, laser welding can be performed so as to directly melt the surface of the thin-walled portion 19d of the end portion of the crimping member 19b and the surface of the negative electrode collector 18a, as shown in FIG. 5B. Note that, since the width of the gap between the edge of the countersunk hole 18c and the end portion of the thin-walled portion 19d of the crimping member 19b becomes large at both ends of the thin-walled portion 19d of the crimping member, the area that can be laser welded so as to directly melt the surface of the thin-walled portion 19d of the end portion of the crimping member 19b and the surface of the negative electrode collector 18a becomes small.

Thus, even with the negative electrode terminal 19B of the second embodiment, the joint section of the thin-walled portion 19d of the end portion of the crimping member 19b and the countersunk hole 18c of the negative electrode collector 18a can be laser welded at a minimum of several points. However, since the range to be laser welded may be smaller compared to that of the negative electrode terminal 19A of the first embodiment, the shape of the thin-walled portion on the center side of the terminal is preferably not linear.

The negative electrode terminal 19 manufactured in such a way will, for example, have the negative electrode collector 18a resistance-welded to the negative electrode substrate exposed portion 15 of the flat rolled electrode assembly 11. Also, the positive electrode terminal 17 manufactured in the same way as the negative electrode terminal 19 will have the collector 16 resistance-welded to the positive electrode substrate exposed portion 14. Thereafter, the flat rolled electrode assembly 11 is inserted in the battery outer can 12, and then the sealing plate 13 is laser welded to the mouth portion of the battery outer can 12. After that, a nonaqueous electrolyte is poured from an electrolyte pour hole (not shown), and then the electrolyte pour hole is sealed up, whereby the nonaqueous electrolyte secondary battery as the secondary battery of the embodiment is obtained.

Also, in the above-described embodiments, the example of using the prismatic outer can is explained, although the shape of the outer can is not particularly limited, and a cylindrical outer can may also be used. However, considering the space efficiency of equipment in which the battery is installed, a prismatic outer can is preferable. Also, in the above-described embodiments, the example of using the flat rolled electrode assembly is explained. However, it is obvious that an electrode assembly stacking flat positive and negative electrode plates with a separator interposed therebetween can also be used. Furthermore, in the above-described embodiment, the explanation is given for the case of the nonaqueous electrolyte secondary battery, although the invention may also be applied to an aqueous electrolyte secondary battery.

What is claimed is:

1. A secondary battery, comprising:
a sealing plate fitted with a terminal;
an electrode assembly made up of positive electrode and negative electrode that are flatly wound with separators; and
an outer can housing the electrode assembly in such a way that a winding axis direction of the electrode assembly is arranged in parallel to the sealing plate and having a mouth portion to which the sealing plate is hermetically fixed,
the electrode assembly being provided with a wound positive electrode substrate exposed portion at one end of the electrode assembly and with a wound negative electrode exposed portion at another end of the electrode assembly,
the positive electrode substrate exposed portion or the negative electrode substrate exposed portion being coupled with a collector,
the terminal being coupled with the collector,
the terminal having a coupling portion formed on one side of a flange portion, and the collector having an opening portion and a thin area made thinner than other portions formed in the circumference of the opening portion of the collector,
the coupling portion being inserted through opening portions formed in a first insulating member, the sealing plate, a second insulating member and the collector,
a tip end side of the coupling portion being deformed in a diameter-increasing direction in the thin area made thinner than other portions formed in the collector,
a surface of the deforming portion in the coupling portion being made approximately flat with a surface of the collector, and
a joint section of the deforming portion in the coupling portion and the collector being welded by irradiating a high-energy beam.

2. The secondary battery according to claim 1, wherein a laser beam or electron beam is employed as the high energy beam.

3. The secondary battery according to claim 1, wherein the electrode assembly is formed in a flat shape.

4. The secondary battery according to claim 1, wherein a positive terminal and a negative terminal are fitted on the sealing plate via insulating members, respectively, and the terminal is at least one of the positive terminal and the negative terminal.

5. The secondary battery according to claim 1, wherein a positive terminal and a negative terminal are fitted on the sealing plate via insulating members, respectively, and the terminals are the positive terminal and the negative terminal.

6. The secondary battery according to claim 1, wherein a terminal potion protruding from the flange portion is formed on the other side of the flange portion.

7. The secondary battery according to claim 1, wherein the coupling portion has a portion of which diameter is constant.

8. The secondary battery according to claim 1, wherein the collector has a first portion arranged in parallel to the sealing plate and a second portion extending perpendicularly from the first portion toward the inside of the outer can of the secondary battery.

9. The secondary battery according to claim 1, wherein the flange portion is chamfered at its corner located facing toward the outside of the outer can of the secondary battery.

10. The secondary battery according to claim 1, wherein a distance between the collector and the sealing plate is smaller at an adjacent area of the opening portion of the collector than a distance between the collector and the sealing plate at a distal area of the opening portion of the collector.

11. A secondary battery, comprising:
a sealing plate fitted with a terminal;
an electrode assembly; and
an outer can housing the electrode assembly and having a mouth portion to which the sealing plate is hermetically fixed,
the terminal being coupled with a collector,
the terminal having a coupling portion formed on one side of a flange portion, and the collector having an opening portion and a thin area made thinner than other portions formed in the circumference of the opening portion of the collector,
the coupling portion having a portion of which diameter is constant, and being inserted through opening portions formed in a first insulating member, the sealing plate, a second insulating member and the collector,
a tip end side of the coupling portion being deformed in a diameter-increasing direction in the thin area made thinner than other portions formed in the collector,
a surface of the deforming portion in the coupling portion being made approximately flat with a surface of the collector, and
a joint section of the deforming portion in the coupling portion and the collector being welded by irradiating a high-energy beam.

12. The secondary battery according to claim 11, wherein the collector has a first portion arranged in parallel to the sealing plate and a second portion extending perpendicularly from the first portion toward the inside of the outer can of the secondary battery.

13. The secondary battery according to claim 11, wherein the flange portion is chamfered at its corner located facing toward the outside of the outer can of the secondary battery.

14. The secondary battery according to claim 1, wherein a distance between the collector and the sealing plate is smaller at an adjacent area of the opening portion of the collector than a distance between the collector and the sealing plate at a distal area of the opening portion of the collector.

15. The secondary battery according to claim 11, wherein a positive terminal and a negative terminal are fitted on the sealing plate via insulating members, respectively, and the terminal is at least one of the positive terminal and the negative terminal.

16. A secondary battery, comprising:
a sealing plate fitted with a terminal;
an electrode assembly; and
an outer can housing the electrode assembly and having a mouth portion to which the sealing plate is hermetically fixed,
the terminal being coupled with a collector,
the terminal having a coupling portion formed on one side of a flange portion, and the collector having an opening portion and a thin area made thinner than other portions formed in the circumference of the opening portion of the collector,
the coupling portion being inserted through opening portions formed in a first insulating member, the sealing plate, a second insulating member and the collector,
a tip end side of the coupling portion being deformed in a diameter-increasing direction in the thin area made thinner than other portions formed in the collector,
a surface of the deforming portion in the coupling portion being made approximately flat with a surface of the collector, and
a joint section of the deforming portion in the coupling portion and the collector being welded by irradiating a high-energy beam,
a distance between the collector and the sealing plate being smaller at an adjacent area of the opening portion of the collector than a distance between the collector and the sealing plate at a distal area of the opening portion of the collector.

17. The secondary battery according to claim 16, wherein the collector has a first portion arranged in parallel to the sealing plate and a second portion extending perpendicularly from the first portion toward the inside of the outer can of the secondary battery.

18. The secondary battery according to claim 16, wherein the flange portion is chamfered at its corner located facing toward the outside of the outer can of the secondary battery.

19. The secondary battery according to claim 16, wherein a positive terminal and a negative terminal are fitted on the sealing plate via insulating members, respectively, and the terminal is at least one of the positive terminal and the negative terminal.

* * * * *